(No Model.)
G. M. BOWMAN.
CULTIVATOR.
No. 435,202.  Patented Aug. 26, 1890.
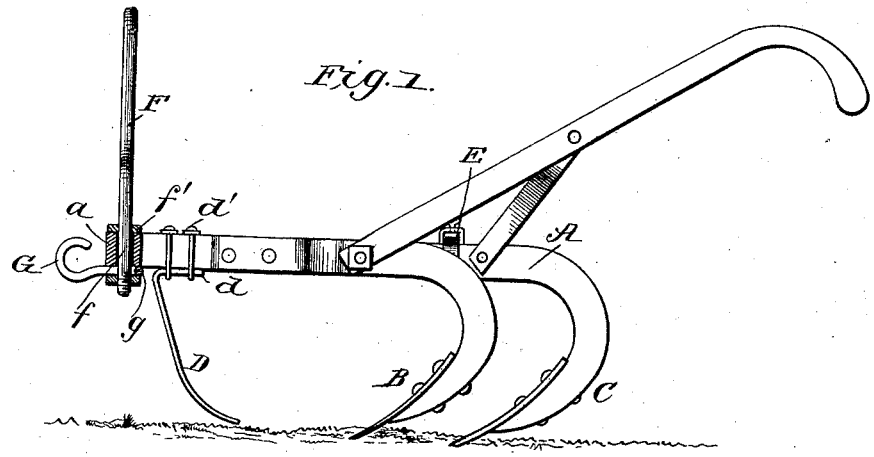
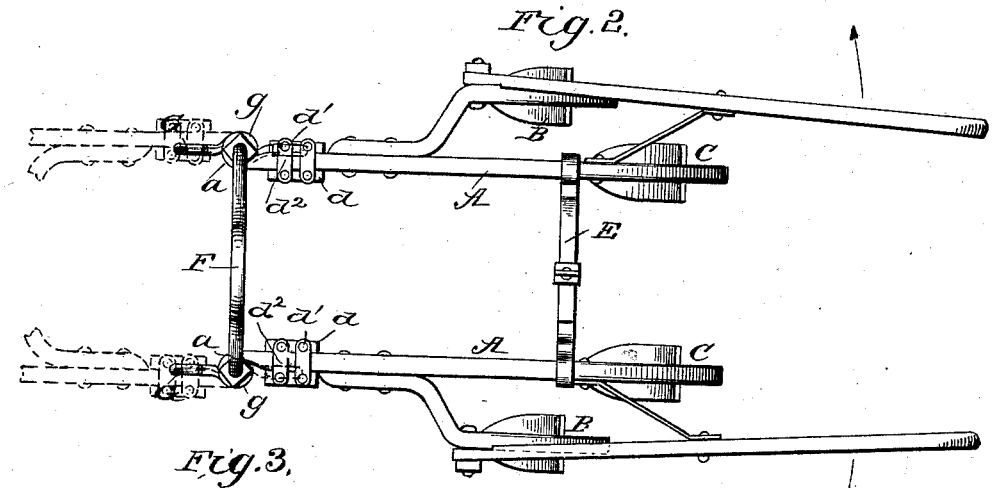
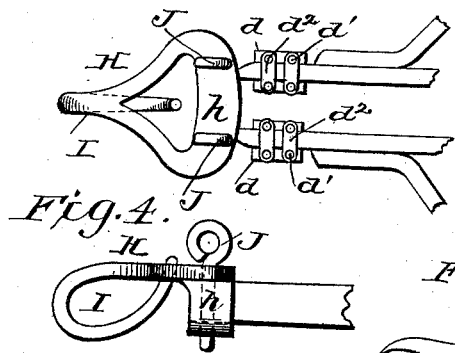
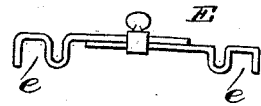
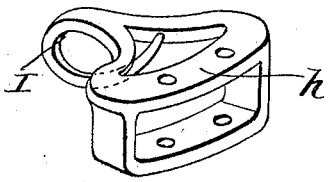
WITNESSES:
Fred G. Dieterich
P. B. Turpin
INVENTOR
G. M. Bowman
BY Munn & Co
ATTORNEY

UNITED STATES PATENT OFFICE.

GIDEON M. BOWMAN, OF SPRINGDALE, ARKANSAS.

CULTIVATOR.

SPECIFICATION forming part of Letters Patent No. 435,202, dated August 26, 1890.

Application filed May 20, 1890. Serial No. 352,569. (No model.)

*To all whom it may concern:*

Be it known that I, GIDEON M. BOWMAN, of Springdale, in the county of Washington and State of Arkansas, have invented a new and useful Improvement in Cultivators, of which the following is a specification.

My invention is an improvement in cultivators; and it consists in certain novel constructions and combinations of parts, as will be hereinafter described, and pointed out in the claims.

In the drawings, Figure 1 is a side view, and Fig. 2 is a top plan view, of my cultivator with the beams spread apart. Fig. 3 is a top plan view, and Fig. 4 a side view, of the front end of the cultivator with the beams adjusted close together. Fig. 5 is a detail view of the cross-brace, and Fig. 6 is a detail view of the box-clevis.

The beams A A are provided with teeth or shovels B and C, the former being arranged in front of the latter, as shown. At their forward ends the beams A are formed with eyes $a\ a$, arranged vertically, as shown. Immediately in rear of these eyes I provide the supports D, which are formed of spring metal and are secured at their upper ends to the beams, preferably by forming such ends to provide clip-plates $d$, which are perforated for the passage of the bolts $d'$, which, together with the top plates $d^2$, operate to secure the supports in position. At their lower ends these supports are free and curved rearwardly. These supports are of sufficient strength to support the plow when needed for that purpose, and are at the same time sufficiently flexible to allow the plows to enter the ground to any suitable depth desired.

It will be understood that any suitable form of cultivator tooth or shovel may be employed.

Where desired, break-pin plows may be used, the same as in any other cultivator, and by breaking the inside plows and dropping the brace E on the outside beams the outside plows may be held the right distance apart for laying off two rows of corn-ground at one through. This brace E may be made adjustable lengthwise, as shown, and is provided at its ends with seats $e$, which preferably are secured by bending the brace-bar, as illustrated in the drawings.

The arch F is provided at its ends with the spindle portions $f$, which fit in the vertical eyes $a$ of the beams A. At the upper ends of the spindles $f$, I provide stop-shoulders $f'$, which rest upon the eyes $a$, and said spindles extend below the said eyes and receive the eyes $g$ of the draft-hooks G, below which are the fastening devices, which may be nuts, as shown, spring-cotters, or other suitable fastening devices. Because of the vertical pivot, as described, the beams may be swung half round to reverse them, by which operation the beams may be set with the front or rear shovels on the inside and adjacent to each other. When a double team is used, one horse may be hitched to each hook G.

In order to work one horse or team to both plows, the beams A may be set with their eyes $a$ close together, and fitting side by side in the box $h$ of clevis H, such clevis having a hook I, and having its box portion $h$ provided with openings registering with the eyes $a$, the said eyes being secured in the box $h$ by bolts or pins J, as shown. By said construction one horse can be used to draw both beams and their attached shovels, and do efficient work in peas, beans, and other small crops, even young cotton, enabling one horse to cultivate both sides of a row at one time through. Larger or smaller teeth or shovels and different shapes of such parts may be used to suit the work being done.

Having thus described my invention, what I claim as new is—

1. The improved convertible cultivating apparatus, substantially as herein described, consisting of the cultivator-beams provided at their forward ends with vertical eyes, the arch provided at its ends with spindle portions to fit in the eyes of the beams, devices for securing the spindles removably in the eyes, and the clevis having a box-like receiver adapted to receive the front ends of the beams when the arch is removed, said clevis being provided with openings arranged to register with the beam-eyes, all substantially as and for the purposes set forth.

2. In a cultivator, substantially as described, the combination, with the beams and the teeth or shovels supported thereby, of the brace E, bent near its ends to form the seats $e$ to engage the beams, all substantially as and for the purpose set forth.

GIDEON M. BOWMAN.

Witnesses:
LEROY A. MASONER,
STARLING Q. BROWN.